Oct. 28, 1930. E. T. MOORE Re. 17,851

ELECTRICAL APPARATUS FOR AUTOMATICALLY CONTROLLING PEAK DEMANDS

Original Filed Feb. 14, 1920 3 Sheets-Sheet 1

INVENTOR
E. T. Moore

WITNESS
H. Wittwer

BY Denison & Thompson
ATTORNEYS

Oct. 28, 1930. E. T. MOORE Re. 17,851

ELECTRICAL APPARATUS FOR AUTOMATICALLY CONTROLLING PEAK DEMANDS

Original Filed Feb. 14, 1920 3 Sheets-Sheet 2

INVENTOR
E. T. Moore

WITNESS
H. Hurst

BY Denison & Thompson
ATTORNEYS

Oct. 28, 1930. E. T. MOORE Re. 17,851

ELECTRICAL APPARATUS FOR AUTOMATICALLY CONTROLLING PEAK DEMANDS

Original Filed Feb. 14, 1920 3 Sheets-Sheet 3

INVENTOR
E. T. Moore

WITNESS
H. H. Hurst

BY Denison & Thompson
ATTORNEYS

Reissued Oct. 28, 1930 Re. 17,851

UNITED STATES PATENT OFFICE

EDWARD T. MOORE, OF SYRACUSE, NEW YORK, ASSIGNOR TO POWER CONTROL CORP., OF SYRACUSE, NEW YORK, A CORPORATION OF NEW YORK

ELECTRICAL APPARATUS FOR AUTOMATICALLY CONTROLLING PEAK DEMANDS

Original No. 1,503,130, dated July 29, 1924, Serial No. 358,748, filed February 14, 1920. Application for reissue filed May 25, 1926. Serial No. 111,669.

This invention relates to certain improvements in electrical apparatus for automatically controlling peak demands, and while it consists broadly of means for controlling power demand in any electrical installation, it is particularly adapted to loads where portions of said load may be interrupted or reduced for a period of time and relates more particularly to apparatus for controlling the power demands of a plant employing electric furnaces where the supply of power may be reduced or interrupted without materially interrupting the output of the furnaces.

It is well known that the operators of central stations or any generating plants object to peak loads for the reason that a greater amount of installed capacity is necessary in order to meet increased power demands existing at that time, and, therefore, the operators of such plants are greatly interested in equalizing its power demand. It is particularly true of central stations on account of the larger number of its power using customers. In order, therefore, to encourage its customers to be on the alert to limit their power demands, it is customary for central stations to use a demand charge as well as the regular schedule of rates for energy, this demand charge being generally based upon the highest average kilowatt demand occurring during any pre-determined interval of, say, 10–15 or 30 minutes, during some longer interval or period of time, of, say, one month.

It is, therefore evident that a consumer whose demand charge increases according as his average kilowatt demand increases, for an interval, of, say, 15 minutes in one month, will obviously be desirous of controlling his power demand and limiting it to the lowest value practicable, while the operators of isolated generating plants will be desirous of similarly controlling their load demand and reducing fuel consumption.

The main object, therefore, of my present invention is to provide means whereby energy supplied to an electrical installation may be controlled at all times, and, particularly, during periods when the demand is high, or, in other words, to provide means for varying or limiting the average demand made by an electric installation upon the source of power supply by pre-determined value.

Other advantages and uses relating to specific parts of the apparatus will be brought out in the following description:

In the drawings:—

Figure 1:
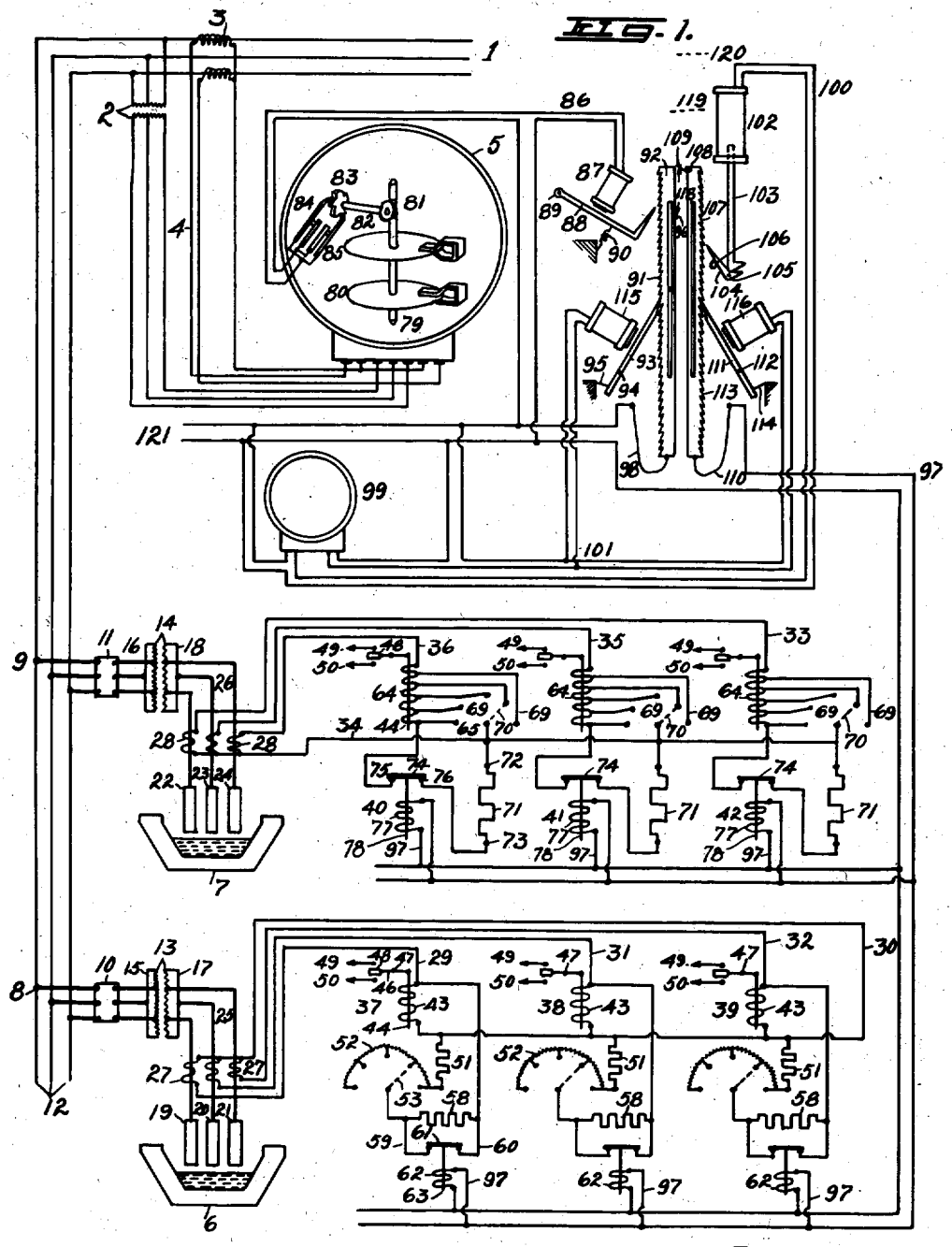
Figure 1 is a diagrammatic view of the ensemble of an apparatus and its connections for carrying out the objects of my invention.

The main source of power supply 1 has potential transformers 2 and current transformers 3 connected as shown, with lead wires 4 extending from the secondary of the instrument transformers 2 and 3 to a watt-hour meter 5. The power load, which, for purposes of illustration may be composed of several electric furnaces such as 6 and 7, is connected to the source of supply at 8 and 9 by oil circuit breakers 10 and 11. Any other power load such as electric steel melting furnaces, ferro-alloy electric furnaces, motors, et cetera, may be connected onto the power line at 12. When necessary to reduce the line voltage, transformers may be used as at 13 and 14, whose primaries 15 and 16 are energized through the oil circuit breakers 10 and 11. The secondaries 17 and 18 are connected to the load such as through electrodes 19, 20, 21, 22, 23, 24. The secondary conductors 25 and 26 have current transformers 27 and 28 connected in circuit with secondary leads 29, 30, 31, 32, 33, 34, 35, 36.

Figure 2:
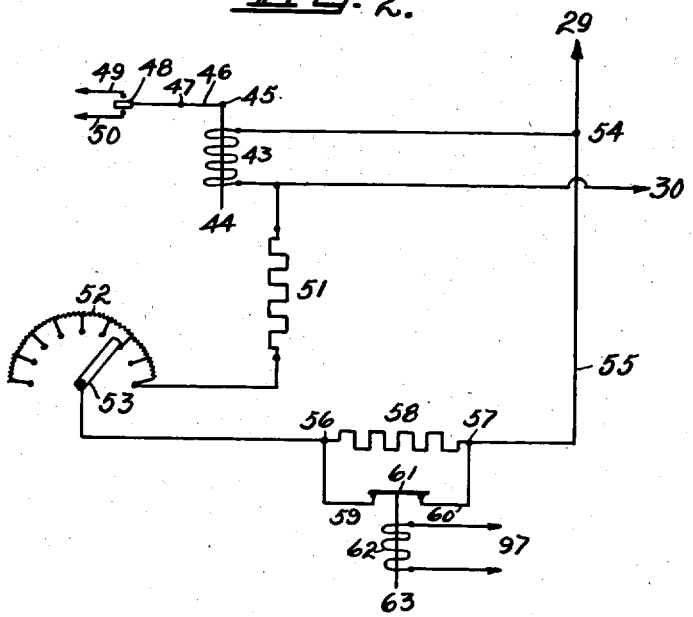
Figures 2 and 3 are diagrammatic detail views of modified types of regulators which may be used in connection with my invention.
Figure 3:
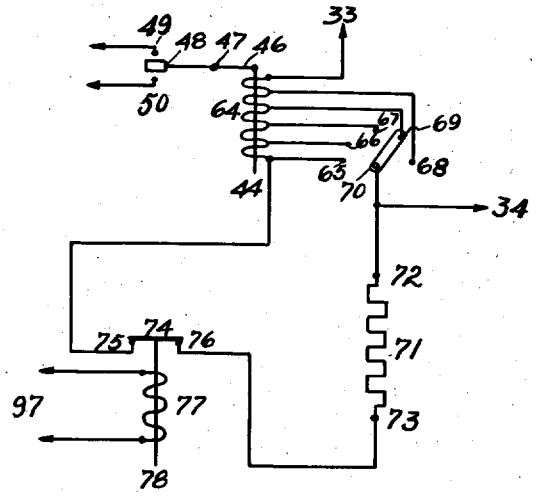
Figure 4:
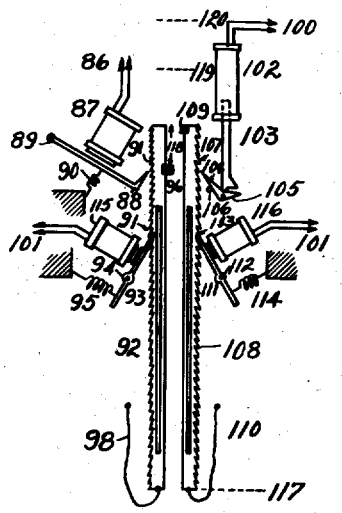
Figure 4 is a detailed view of what may be termed a "riser bar mechanism."

The apparatus on panels 37, 38 and 39 is similar, and differs from panels 40, 41 and 42 which are similar, as hereinafter described. These panels have mounted thereon, in part, standard regulator parts used in electric furnace operation in which 43, Fig. 2, are suitable solenoid coils on panels 37, 38, 39, of preferably 5 amperes capacity, connected into the circuit of the secondary of the current transformers 27 by the leads 29, 30, 31, and 32. In Fig. 3, are suitable solenoid coils 64 on panels 40, 41, 42, preferably of 5 amperes capacity connected into the circuit of the secondary of the current transformers 28 by the leads 33, 34, 35, 36.

It will, therefore, be apparent that any fluctuations in load on the furnaces 6 and 7 will cause proportional current changes in the secondaries of the current transformers 27 and 28 and consequently in the solenoids 43 and 64. A plunger 44 is within the solenoid 43 and moves in an upward and downward direction as the load on the furnace 6 fluctuates. This plunger 44 is pivoted at 45 to an arm 46 pivoted at 47. The arm 46 has a contact 48 which travels between contacts 49 and 50. When the load on the furnace 6 becomes higher than a predetermined value, arm 46 will be moved by the actions of the solenoid 43 to cause contact 48 to make contact with contact 49. This action causes an auxiliary contactor (not shown in drawing) to operate to control an electrode motor which will raise the electrodes 19, 20 and 21 and reduce the load. A lower load on furnace 6 will cause solenoid 43 to lower contact 48 of arm 46 so that contact 48 will contact with contact 50 causing the electrode motor to lower electrodes 19, 20 and 21, which will raise the load on furnace 6.

In order to adjust or predetermine the load on furnace 6, a rheostat with resistance 52 and adjusting arm 53 is shunted across the solenoid 43 with permanent resistance 51 in series with rheostat resistance 52. In standard practice arm 53 is directly connected to the solenoid lead at point 54 but for the purpose of this invention connecting lead 55 extending between points 53 and 54 is broken at points 56 and 57 by the establishment of a special resistance 58, preferably of a value of approximately 6 ohms. This resistance 58 is normally shunted by the relay 61 through contacts 59 and 60, and relay 61 has a solenoid 62 and plunger 63.

Panels 40, 41 and 42 are similar to each other and to panels 37, 38 and 39 where like parts are similarly numbered. The contact making ammeters on panels 40, 41 and 42 are similar to those on panels 37, 38 and 39, except solenoid 64 differs from solenoid 43 in that it is wound up in sections with taps 65, 66, 67, 68, etc., brought out and terminated on the dial switch 69 with adjusting arm 70. The solenoid coils 64 are connected to the secondary of the current transformers 28 through leads 33, 34, 35, 36. The action of solenoids 64, plungers 44, arms 46 and contacts 48 on panels 40, 41, 42 will, therefore, be similar to solenoids 43, etc., on panels 37, 38, 39. In adjusting the function of solenoids 64 the dial switches 69 are used on panels 40, 41, 42, whereas on panels 37, 38, 39, solenoids 43 are adjusted by the rheostat 52.

For the purposes of this invention a special resistance 71 of a value of approximately 9 ohms is connected between points 72 and 73. Normally this special resistance 71 is shunted across the points 64 and 70 for the relay 74 has its contact 75 and 76 closed, as the solenoid 77 is not energized. When the demand reaches the predetermined value, the solenoid 77 will be energized, plunger 78 raised, and contacts 75 and 76 opened, causing the adjustment of the current and ampere turns in solenoid 64 to be changed, permitting plunger 44 to rise, and contact 48 to touch contact 50, thus raising electrodes of the furnace 7 and reducing the load on the supply mains 1.

Figure 5:
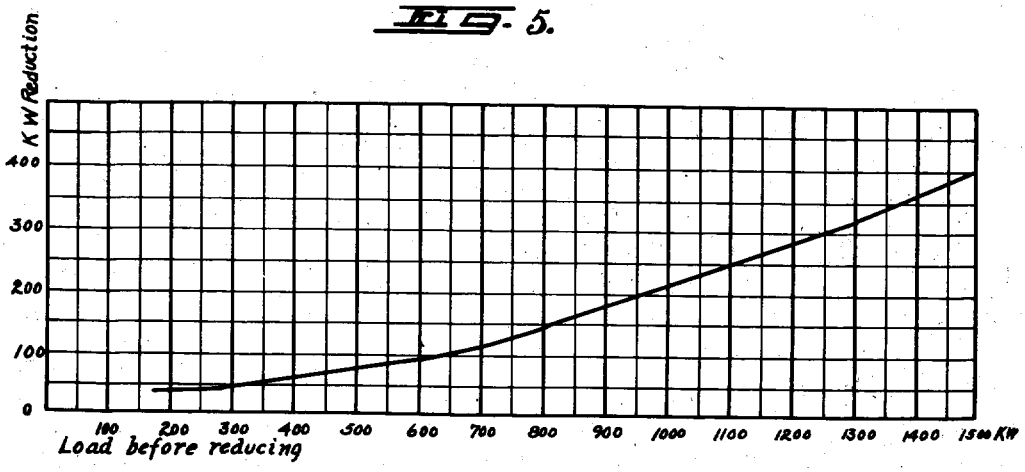
Figure 5 is a diagram of the curve illustrating the degree of load reduction for a given load.

The special resistances 58 and 71 will not always be of the same value in ohms since one feature of this invention is to so proportion this resistance that the percentage the load is reduced automatically when the predetermined demand has been reached will be directly proportional to the value of the load existing at the time of the reduction. By referring to the curve in Figure 5, it will be noted that when a given furnace has a load, of, say, 1500 kw., the load will automatically be reduced 400 kw. or down to 1100 kw., at 1250 kw., the load will automatically be reduced 300 kw., to 950 kw., at 1000 kw., reduced 210 kw., to 790 kw., at 500 kw. reduced 75 kw. to 425 kw. This gradation in load can be changed at any time by changing the value of the special resistances 58 and 71, although for most purposes the resistance should be adjusted for a value to produce reductions as indicated in Figure 5. These resistances 58 and 71 may be arranged with taps and so connected that the load value of reduction may be changed instantly at any time either manually or automatically. There will also be instances where the load reduction should be made a certain definite percentage of the existing load irrespective as to whether the load is great or small. Also, there will be instances where the load reduction should be a certain definite kw. value irrespective of the size of the load. It is also obvious that a certain combination of these methods of load reduction may be used to advantage for the purpose of this invention.

The watthour meter 5 may be any of the commercial polyphase meters on the market or several single phase meters but for our purpose herewith a polyphase meter is used having a rotating shaft 79 with disc 80. The shaft 79 has a worm gear 81 which meshes with a spur gear wheel 82 and through the shaft 79, the insulated toothed wheel 83 is rotated. This toothed wheel 83, may have one, three, five or a suitable number of teeth depending upon the meter constant. The toothed wheel 83 causes the contacts 84 and 85 to be alternately closed momentarily thus energizing the circuit 86 and the electromagnet 87. For every revolution of the meter disc 80, therefore the electromagnet 87 will be energized two, six or ten times or twice the number of times that the toothed wheel 83 has teeth. When the electromagnet 87 is energized, the arm 88 which is pivoted at 89 and held normally away from the magnet 87 by the spring 90 is pressed upward against one of the teeth 91 of the meter contact riser bar 92. After the magnet 87 is deenergized the arm 88 drops away from the magnet 87 and the teeth 91 of meter contact riser bar 92, because of the action of spring 90. The meter contact riser bar 92 will not drop back to its former position, however, as the arm 93 pivoted at 94 with spring 95 is normally engaged with a tooth 91 of meter contact riser bar 92. The meter contact riser bar 92 has a contact 96 and is connected into the circuit 97 through the flexible lead 98.

The contact making clock 99 is arranged to give out momentary electric impulses every five minutes over the circuit 100 and every fifteen minutes over the circuit 101, although these periods of time may be adjusted to meet any desired condition.

When the five minute contact is made over circuit 100 the magnet 102 is momentarily energized causing plunger 103 and finger 104 to be raised. Since finger 104 is pivoted at 105 and normally held out of contact with teeth 107 by the stop 106, it will be seen that when the five minute circuit 100 and magnet 102 is momentarily energized by the clock 99 the plunger 103 and finger 104 will pull the clock contact riser bar upward a distance 118 equal to the travel of the plunger 103. The plunger 103, however, will return immediately to its downward position by the action of gravity as soon as the electric impulse ceases from clock 99 and in this downward position the finger 104 is held out of mesh with the teeth 107 by the stop 106. As soon as plunger 103 has raised a trifle the finger 104 is raised off the stop 106 so that finger 104 will mesh with teeth 107 and pull the clock contact riser bar 108 upward. This riser bar 108 has a contact 109 and flexible lead 110. When the magnet 102 releases the plunger 103 and finger 104, the finger 104 will slide past the teeth 107 of the clock contact riser bar 108 because the downward friction of finger 104 against the teeth overcomes the tension of its actuating spring. Clock contact riser bar 108 will remain in its upward position as drawn by the magnet 102 since arm 111 pivoted at 112 is held against the teeth 113 of the riser bar 108 by action of the spring 114.

When the fifteen minute contact is made by the clock 99 over circuit 101, the magnets 115 and 116 are momentarily energized, thus drawing arms 93 and 111 away from the teeth 91 and 113 of riser bars 92 and 108 respectively, causing riser bars 92 and 108 to drop to their downward position at 117. The source of current supply for energizing the magnets 87, 102, 115 and 116 is connected to the circuit 121.

It will, therefore, be apparent that as the meter disc 80 of meter 5 rotates faster due to an increasing use of energy in the circuit 1 the meter contacts 84 and 85 will be closed a greater number of times in a given interval, thus causing the magnet 87 to pull the meter contact riser bar 92 upward in equal successive stages a greater number of times. When the meter contact riser bar 92 and clock contact riser bar 108 are in their downward position at 117 there is a certain predetermined distance between contacts 96 and 109 of the riser bars 92 and 108. This distance 118 is variable by moving the contacts 96 and 109 and is proportional to the maximum demand which has been determined as the energy demand not to be exceeded. Every five minutes beginning at five minutes after the hour the magnet 102 is energized causing contact 109 to be raised to the position 119. If the energy consumed has not been sufficient to cause the disc 80 of meter 5 to rotate to cause the riser bar 92 to rise enough to allow contact 96 to touch contact 109, no action will result, and at ten minutes after the hour, the riser bar 108 will be pulled into position 120. If the energy consumption has not reached the predetermined amount at the end of fifteen minutes, the contacts 96 and 109 will not touch and no action results. At the end of the fifteen minute period the magnets 115 and 116 will cause the riser bars 92 and 108 to drop to their downward position at 117. This process will be repeated every quarter of an hour when the contact making clock 99 is arranged accordingly to suit a fifteen minute demand period. It will be understood, however, that any demand period could be selected and the apparatus adapted accordingly.

If the energy consumption for any five minutes is such as to cause contact 96 to touch contact 109, the circuit 97 will be energized causing solenoids 62 and 77 to operate causing relays 61 and 74 to break contacts 59 and 60 and 75 and 76, thus throwing special resistance 58 to series with rheostat 52, and special resistance 71 across one or more coils of solenoid 64 depending on the position of arm 70 on taps 65, 66, 67, 68, etc., thus weakening the effective pulling power of solenoids 43 and 64, causing plungers 44 to rise and contacts 48 to touch contacts 50, thus operating the electrode motor mechanism to raise the electrodes and thereby reduce the load.

It should be noted that contact 96 is raised one tooth at a time at a rate depending solely upon the speed of the meter disc 80. Its rate of travel is, therefore, not uniform. Contact 96 on the other hand is normally a distance 118 below contact 109, equivalent to a five minute period or one third of the demand rate. At the end of the first five minutes, contact 109 is raised a distance equal to 118 to position 119. At the end of ten minutes, contact 109 will be raised a distance equal to 118 to position 120, which is equivalent to three five minute periods or the total demand period in question. The contact 109, therefore, always rises at equal time periods and over equal distances.

For purposes of illustration the load control, using two different types of regulators, has been described, one type on panels 37, 38, 39, the other type on panels 40, 41, 42. It will be understood, however, that one or more of each or both of these types of regulators can be used in an illustration and it will occur to those skilled in the art that other types of regulators including the well known Thury regulator may be adapted for this invention. In adapting the Thury system of furnace control to this invention the special resistance 58 of suitable value is connected in series with the Thury regulator rheostat much the same as the special resistance 58 is connected in series with rheostat 52. The Thury regulator rheostat is shunted across the terminals of the actuating solenoid, and this actuating solenoid is connected to the secondary of current transformers such as at 27 and 28, the Thury solenoid corresponding to solenoid 43 and having similar functions.

The meter contact riser bar 92 and clock contact riser bar 108 for the purposes of this invention moves in an upward and downward direction but it will be understood that we do not limit ourselves to this upward and downward motion since a suitable contact 96 could be arranged on a horizontal bar or a wheel and contact 109 arranged on another parallel horizontal bar or adjacent wheel having a common axis, in such manner that contact 109 would normally be in advance of contact 96. In the event the revolution of the wheel having contact 96 was greater than the revolution of wheel having contact 109, then contact 96 under such conditions would overtake and make contact with contact 109, causing similar action in circuit 97 as described hereinbefore. The contacts 96 and 109 may, therefore, be properly actuated in a rotary, horizontal or vertical direction although we have found the vertical motion to be much superior to the other.

While the above specification has referred to electric furnace regulators, it has been done merely for descriptive purposes for obviously its use can be adapted to and will be found advantageous for other types of regulators or for use without regulators.

I have described my invention by drawings and by describing the various functions of the component parts, but it will be understood that my invention may be used in many other forms. I do not, therefore, wish to be restricted to the exact details of construction as disclosed herein, which have been shown by way of example for the purpose of setting forth my invention. The appended claims are not restricted to the precise constructions disclosed, but are intended to cover all changes and modifications within the spirit and scope of the invention. Furthermore, the movement of the riser bars 92 and 108 may be recorded by suitable markers actuated thereby upon a chronometer actuated rotary dial or record sheet thereon to graphically show the conditions of load in the working circuit for any of the predetermined intervals of time, as for example, during each 15 minute period, the use of such a device being contemplated in connection with the riser bars or equivalent mechanism.

I claim as my invention the following:

1. The combination with an electric working circuit including therein an electric meter, of automatic means for controlling the peak demands in said circuit, comprising normally spaced cooperative contacts movable one in relation to the other, electrically operated means controlled by said meter for gradually moving one of the contacts toward the other at a rate of speed proportionate to the speed of the meter and electrically operated means controlled by said contacts for causing a reducing of the power demands in said circuit in case the contacts should be closed during a predetermined interval of time.

2. The combination with an electric working circuit including therein an electric meter, of means for automatically controlling peak demands in said circuit, comprising normally spaced cooperative contacts movable one in relation to the other, electrically operated means controlled by said meter for moving one of said contacts step by step toward the other contact, electrically operated means controlled by said contacts for reducing said demands in case the contacts should be closed during a predetermined interval of time, means for holding the movable contact in its adjusted position and chronometer controlled electrically operated means for withdrawing said holding means from its holding position at the end of said interval of time.

3. The combination with an electric working circuit, including therein an electric meter, of means for automatically controlling peak demands in said circuit, comprising normally spaced cooperative contacts of a controlling circuit, an electromagnet, means actuated by the meter for producing impulses in the electro-magnet at a rate of speed proportionate to that of the meter, means actuated by said electro-magnet at each impulse for adjusting one of the contacts toward the other, means for holding said contact in its adjusted position, an electro-magnet for tripping said holding means, chronometer controlled means for energizing the second named magnet at regular pre-determined intervals of time and means controlled by said controlling circuit for reducing said demand in case said contacts should be closed during one of said intervals of time.

4. The combination with an electric working circuit including therein an electric meter, normally separated cooperative contacts of a controlling circuit movable each in relation to the other, an electro-magnet, means actuated by the meter for producing current impulses in the electro-magnet at a rate of speed proportionate to that of the meter, means actuated by said electro-magnet at each impulse for adjusting one of the contacts step by step toward the other contact, means for holding said contact in its adjusted position, chronometer controlled electrically operated means for adjusting the other contact in the direction of the first named contact at regular pre-determined intervals of time, separate devices for holding said contacts in their adjusted position, chronometer controlled electrically operated means for tripping said devices at the end of a predetermined interval of time, and electrically operated means controlled by said controlling circuit for reducing said demands in case said contacts should be closed during any one of said intervals of time.

5. The combination with an electric working circuit, including therein an electric meter, normally spaced cooperative contacts of a controlling circuit, movable each in relation to the other, an electro-magnet, meter actuated means for producing current impulses in said electro-magnet at a rate of speed proportionate to that of the meter, means actuated by said electro-magnet at each impulse for adjusting one of the contacts step by step in one direction, chronometer controlled electrically operated means for adjusting the other contact step by step in the same direction as that of the first-named contact and at pre-determined intervals of time, devices for holding said contacts in their adjusted position, chronometer controlled electrically operated means for tripping said devices at the end of a pre-determined interval of time, a solenoid connected in said controlling circuit and electrically operated means controlled by said solenoid for reducing said demands in case the contacts are closed during any one of said intervals of time.

6. A maximum power demand controller for electrical power installations comprising an energy meter in the power circuit, a pair of non-flexible bars movable in the same general direction and provided with cooperative contact members normally spaced apart in the direction of movement from their normal positions, meter-controlled electrically operated means for moving one of said bars a distance depending upon the speed of the meter for a given period of time to cause its contact member to approach that of the other bar, whereby the contact members will be brought into contact in case the speed of the meter exceeds a pre-determined degree during said given period of time and, electrically operated means brought into action by the closing of said contact members for reducing the power demand in the power circuit, means for holding the adjusted bar in its adjusted position and chronometer controlled electrically operated means for releasing said holding means at the end of a pre-determined interval of time not less than the first named period.

7. A maximum power demand controller for electrical power installations comprising an energy meter in the power circuit, a pair of non-flexible bars movable in the same general direction and provided with cooperative contact members normally spaced apart in the direction of movement from their normal positions, meter-controlled electrically operated means for moving one of said bars a distance depending upon the speed of the meter for a given period of time to cause its contact member to approach that of the other bar, whereby the contact members will be brought into contact in case the speed of the meter exceeds a predetermined degree during said given period of time and, electrically operated means brought into action by the closing of said contact members for reducing the power demand in the power circuit, the normal distance between the contact members being proportional to the pre-determined maximum energy demand for said given period.

8. A maximum power demand controller for electrical power installations comprising an energy meter in the power circuit, a pair of non-flexible bars movable in the same general direction and provided with cooperative contact members normally spaced apart in the direction of movement from their normal positions, meter-controlled electrically operated means for moving one of said bars a distance depending upon the speed of the meter for a given period of time to cause its contact member to approach that of the other bar, whereby the contact members will be brought into contact in case the speed of the meter exceeds a pre-determined degree during said given period of time and, electrically operated means brought into action by the closing of said contact members for reducing the power demand in the power circuit, and chronometer controlled electrically operated means for moving said other bar to cause its contact member to move away from the first named contact member at the end of said given period of time.

9. A maximum power demand controller for electrical power installations comprising an energy meter in the power circuit, a pair of non-flexible bars movable in the same general direction and provided with cooperative contact members normally spaced apart in the direction of movement from their normal positions, meter-controlled electrically operated means for moving one of said bars a distance depending upon the speed of the meter for a given period of time to cause its contact member to approach that of the other bar, whereby the contact members will be brought into contact in case the speed of the meter exceeds a pre-determined degree during said given period of time, and electrically operated means brought into action by the closing of said contact members for reducing the power demand in the power circuit, chronometer controlled electrically operated means for moving said other bar step by step at the end of successive pre-determined intervals of time to cause a similar step by step movement of its contact member away from the first named contact member.

10. A maximum power demand controller for electrical power installations comprising an energy meter in the power circuit, a pair of non-flexible bars movable in the same general direction and provided with cooperative contact members normally spaced apart in the direction of movement from their normal positions, meter-controlled electrically operated means for moving one of said bars a distance depending upon the speed of the meter for a given period of time to cause its contact member to approach that of the other bar, whereby the contact members will be brought into contact in case the speed of the meter exceeds a pre-determined degree during said given period of time, and electrically operated means brought into action by the closing of said contact members for reducing the power demand in the power circuit, means for holding said other bar in its different positions of adjustment, and chronometer controlled electrically operated means for releasing said holding means at the end of the last of the successive movements of the bar.

11. A maximum power demand controller for electric furnace installations, comprising a current element responsive to varying loads on the furnace, means including the electric furnace for effecting a reduction in the power demand on said furnace, and means responsive to the action of the current element for effecting the operation of the first-named means when the current energy in the furnace exceeds a predetermined amount during a predetermined interval of time.

12. A maximum power demand controller for electrical power installations, including an electric furnace and electrodes movable into and out of contact with the molten metal, and means for operating the electrodes, in combination with means including an electrical resistance for controlling the electrode-operating means, an energy meter in the power circuit, and means responsive to the action of the meter for cutting in said resistance when the power demand in the power circuit exceeds a predetermined amount during a predetermined interval of time.

In witness whereof I have hereunto set my hand this 17th day of May, 1926.

EDWARD T. MOORE.